United States Patent [19]

Bayya et al.

[11] Patent Number: 5,774,860
[45] Date of Patent: Jun. 30, 1998

[54] ADAPTIVE KNOWLEDGE BASE OF COMPLEX INFORMATION THROUGH INTERACTIVE VOICE DIALOGUE

[75] Inventors: Aruna Bayya, Westminster; Louis A. Cox, Jr., Denver, both of Colo.

[73] Assignee: U S West Technologies, Inc., Boulder, Colo.

[21] Appl. No.: 741,298

[22] Filed: Oct. 30, 1996

Related U.S. Application Data

[63] Continuation of Ser. No. 266,825, Jun. 27, 1994, abandoned.
[51] Int. Cl.$^6$ .................................................. G10L 3/00
[52] U.S. Cl. ..................... 704/275; 704/270; 364/443; 364/444.1; 364/449.4
[58] Field of Search ............................. 395/2.84, 2.79; 364/444.1, 449.4, 443

[56] References Cited

U.S. PATENT DOCUMENTS

| | | | |
|---|---|---|---|
| 5,177,685 | 1/1993 | Davis et al. | 364/443 |
| 5,274,560 | 12/1993 | LaRue | 364/444 |
| 5,357,596 | 10/1994 | Takebayashi et al. | 395/2.84 |

OTHER PUBLICATIONS

V. W. Zue, "Toward Systems That Understand Spoken Language," IEEE ARPA Strategic Computing Initiative, Feb. 1994, pp. 51–59.

*Primary Examiner*—Allen R. MacDonald
*Assistant Examiner*—Robert Sax
*Attorney, Agent, or Firm*—Brooks & Kushman P.C.

[57] ABSTRACT

A method and system for providing user access to complex information through interactive voice dialog. The computerized method includes the provision of a memory and storage in the memory of a plurality of selected words which may be recognized in predetermined phrases and dialogue contexts when spoken by users. A voice template is further stored in memory having selected information slots in corresponding frames. Each of the slots and frames is adapted to be continuously filled by recognized words. User speech utterances are initiated for receipt by the computer which requests complex information or responds to generated queries. By continuously receiving and comparing the user speech utterances to the stored plurality of selected words, slots and frames of the voice template are filled. Based on the context of the interactive dialogue and the extent of recognized vocabulary words, responsive speech segments are generated which provide the requested complex information or, alternatively, request additional information necessary to provide a full response to the user.

2 Claims, 2 Drawing Sheets

ADAPTIVE KNOWLEDGE BASE OF COMPLEX INFORMATION THROUGH INTERACTIVE VOICE DIALOGUE

This is a continuation of application Ser. No. 08/266,825 filed on Jun. 27, 1994 now abandoned.

TECHNICAL FIELD

The present invention relates generally to a method and system for providing telephone users with access to complex information sources through interactive spoken dialogue. More particularly, the invention relates to a method and system for interactively providing street map directions to remote users over a communication link such as a wireless telephone system.

BACKGROUND ART

There are currently many existing complex information sources which are not readily accessible to mobile users. The limitations of current technology coupled with the prohibitive costs of implementation have, to date, restricted access to these sources.

Information access methods and systems may be divided into two general groups: (1) interactive; and (2) non-interactive. As those skilled in the art have long recognized, interactive methods and systems, i.e. those which permit direct interaction between the user and the information source, have both theoretical and practical advantages. These systems generally make use of specially designed Customer Premises Equipment (CPE) devices and voice dialogue. Consider, for example, prior interactive solutions for accessing street map directions and other logistics information which have been implemented on a limited basis by automobile rental companies. These systems have generally required the use of actual human operators or, alternatively, sophisticated in-vehicle multi-media displays. The latter displays are generally operable in conjunction with the Global Positioning System (GPS) for tracking and interactively determining the positions of the associated vehicles and for providing responsive routes/directions on corresponding display monitors. These systems which generally require special hardware and high quality input are prohibitively expensive to implement on a large scale commercial basis. They have also been found unsuitable for hands-busy/eyes-busy activities, such as those encountered during normal driving.

Non-interactive information access methods and systems, i.e. those which provide stored information in response to selected queries have met with limited application success in view of their inherent inability to adapt to changing information requirements and contexts. Consider, for example, solutions of this type which have again been implemented by automobile rental companies to provide street map directions. Such systems, like the interactive systems referenced above, generally require the use of multi-media displays at fixed locations such as, for example, at the automobile rental office, along with printers for retrieving and displaying the requested information to the user. Non-interactive information access methods and systems have similarly been incorporated in office building lobbies and the like to provide information regarding the location of participating tenants. These systems are severely limited in capability and use since no direct interaction takes place between the system and the user. They only provide canned data streams in response to pre-specified queries and are unable to adapt as a communication context changes, for example, from a question, to a confirmation, to a request, etc.

Consequently, a need has developed to provide a method and system capable of providing interactive access to complex information which overcomes the limitations of prior art approaches. More particularly, a need has developed to provide a method and system capable of providing access to complex information through interactive voice dialogue.

DISCLOSURE OF THE INVENTION

It is a principal object of the present invention to provide a method and system for interactively accessing complex information.

More particularly, it is an object of the present invention to provide a method and system of the type referenced above wherein such interactive access to complex information is provided through voice dialogue.

It is yet another object of the present invention to provide a method and system for interactively providing street map directions over a communication link such as a wireless telephone system.

Yet another object of the present invention is the provision of a method and system for providing street map information which utilizes speech recognition or word identification.

Still further, it is an object of the present invention to provide a method and system wherein a plurality of vocabulary words are recognized in predetermined combinations and sequences indicating predetermined contexts in dialogue.

Still further, it is an object of the present invention to provide a method and system for interactively accessing complex information of the type immediately referenced above, which adaptively generates, based on the determined context of the interactive dialogue and on of recognized vocabulary words, responsive speech segments which provide the requested complex information or, alternatively, request additional information necessary to provide a responsive answer to the user.

In carrying out the above objects, features, and advantages of the present invention, there is provided an Artificial Intelligence (AI) based method for providing user access to complex information through interactive voice dialogue. The method is provided for use in cooperation with a computer having memory and includes the initial step of storing in memory a plurality of selected words which may be recognized in predetermined phrases and dialogue contexts when spoken by users. Also stored in computer memory is a voice template having selected information slots and corresponding frames. Each of the information slots and frames are adapted to be continuously filled by recognized words. In the preferred embodiment, the information slots comprise "current location", "destination" and "orientation". Also in the preferred embodiment, the frames corresponding to the "current location", "destination" and "orientation" slots each comprise "cross street" and "landmarks".

By initiating user speech utterances, complex information may be requested from the computer or responses may similarly be provided to queries generated by the computer. By continuously receiving and comparing the user speech utterances to the stored plurality of selected words, the above-referenced slots and frames of the voice template may be filled. Responsive speech segments may thereafter be adaptively generated, based on the context of the interactive dialogue and the extent of recognized vocabulary words. The responsive speech segments provide the requested complex information or, alternatively, request additional information necessary to provide a full response to the user.

In further carrying out the above disclosed objects, features, and advantages of the present invention, a system is provided for permitting access to complex information through interactive voice dialogue and, in particular, for providing voice directions from a central office to a remote caller over a communication link, such as a wireless telephone system. All information exchanged between the caller and the system is communicated over ordinary telephone channels using a spoken dialogue interface. No visual displays of maps or printed lists of directions are required. Like the method reference above, the system accepts unrestricted utterances, e.g., naturally-worded statements, queries, explanations and sentence fragments, as inputs from the user. In response, the system produces structured statements and questions, utilizing information from a voice template as referenced above. The only equipment that the user requires in order to use the system is a telephone.

The system is preferably used in cooperation with a wireless telephone, which is the only special onboard equipment in the caller's vehicle required in order to use the system. In accordance with the invention, the system includes a computer having memory and which is adapted to store a plurality of selected words which may be recognized in predetermined phrases and dialogue contexts when spoken by users. A voice template is also provided having selected information slots and corresponding frames. Each of the slots and frames are adapted to be continuously filled by recognized words. Still further, a processor is provided in electrical communication with the computer memory. The processor is adapted to continuously receive and compare user speech utterances to the stored plurality of selected words so as to fill the slots and frames of the voice template. Finally, means is provided for adaptively generating based on the context of interactive dialog and the extent of recognized vocabulary words, responsive speech segments which provide the requested complex information or, alternatively, request additional information necessary to provide a full response to the user.

BRIEF DESCRIPTION OF THE DRAWINGS

A more complete understanding of the present invention may be obtained from the following detailed description in which like reference numerals correspond to like components and wherein.

BEST MODES FOR CARRYING OUT THE INVENTION

Figure 1:
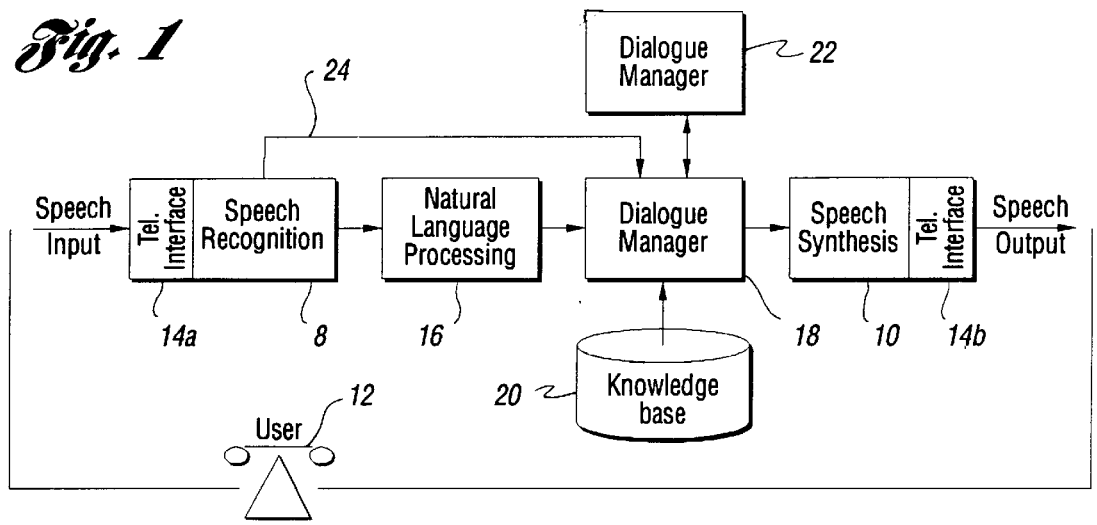
FIG. 1 is a block diagram of the system of the present invention.

FIG. 1 of the drawings provides a block diagram of the system of the present invention which is designated generally by reference numeral 10. System 10 is shown in a preferred embodiment which allows the user to carry out an interactive spoken dialogue in which the user/caller asks and/or answers queries about her current location, orientation and desired destination. In operation, the user is provided directions to reach the destination and any other relevant information such as interim or total distances, travel time, landmarks, etc.

As shown in FIG. 1, system 10 includes a speech recognition component 12, which includes as a subcomponent a voice template 14 having selected information slots and corresponding frames each of which is adapted to be continuously filled by recognized vocabulary words. In accordance with the invention, a plurality of such words which may be recognized in predetermined phrases and dialogue contexts when spoken by users are stored in computer memory. The system further includes an Artificial Intelligence (AI) component 16 which may include various internal modules such as a natural language processor, a dialogue manager, a route planner, a knowledge database, a speech synthesis component, etc. It is contemplated that the AI component and its internal modules will run on a single computer platform such as, for example, an IBM PC. It is recognized, however, that other suitable or additional platforms may, of course, be utilized depending upon the application. The speech recognition and speech synthesis components 12 and 18 comprise off-the-shelf hardware/software products. The telephone interface 20a and 20b is also provided as an integral part of the speech recognition/synthesis componentry. The remaining components are software-based.

FIG. 1 indicates that processing of a user's call by system 10 is carried out sequentially. Thus, telephone interface 20a, 20b resides on a recognition board and is capable of answering a telephone call, recording the speech input from the user, playing back the system responses to the user, and detecting a hangup/disconnect when the user terminates the current session. In operation, when the user calls the system, the telephone interface 20, depicted as 20a, 20b, answers the call and connects the user to the speech recognition module 12. In this preferred embodiment, the system employs a conventional wireless telephone such as, for example, mobile telephone 22 which may be hand portable or affixed within a motor vehicle. While shown as two blocks, the interface circuitry 20a, 20b is usually an integral part of speech recognition module 12.

OPERATION

Figure 2:
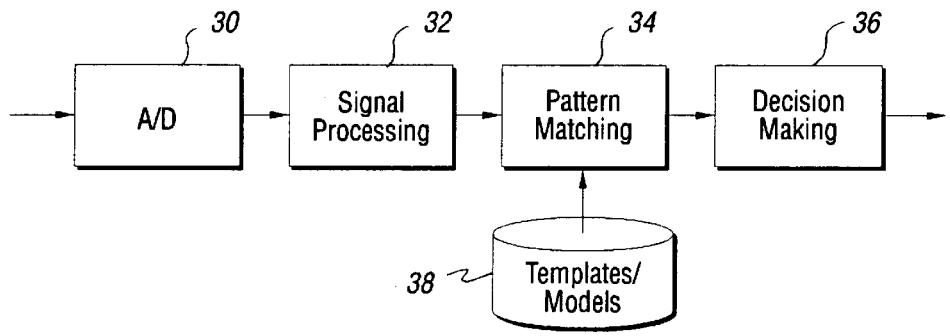
FIG. 2 is a block diagram of the speech synthesis unit of the present invention shown in FIG. 1.
Figure 4:
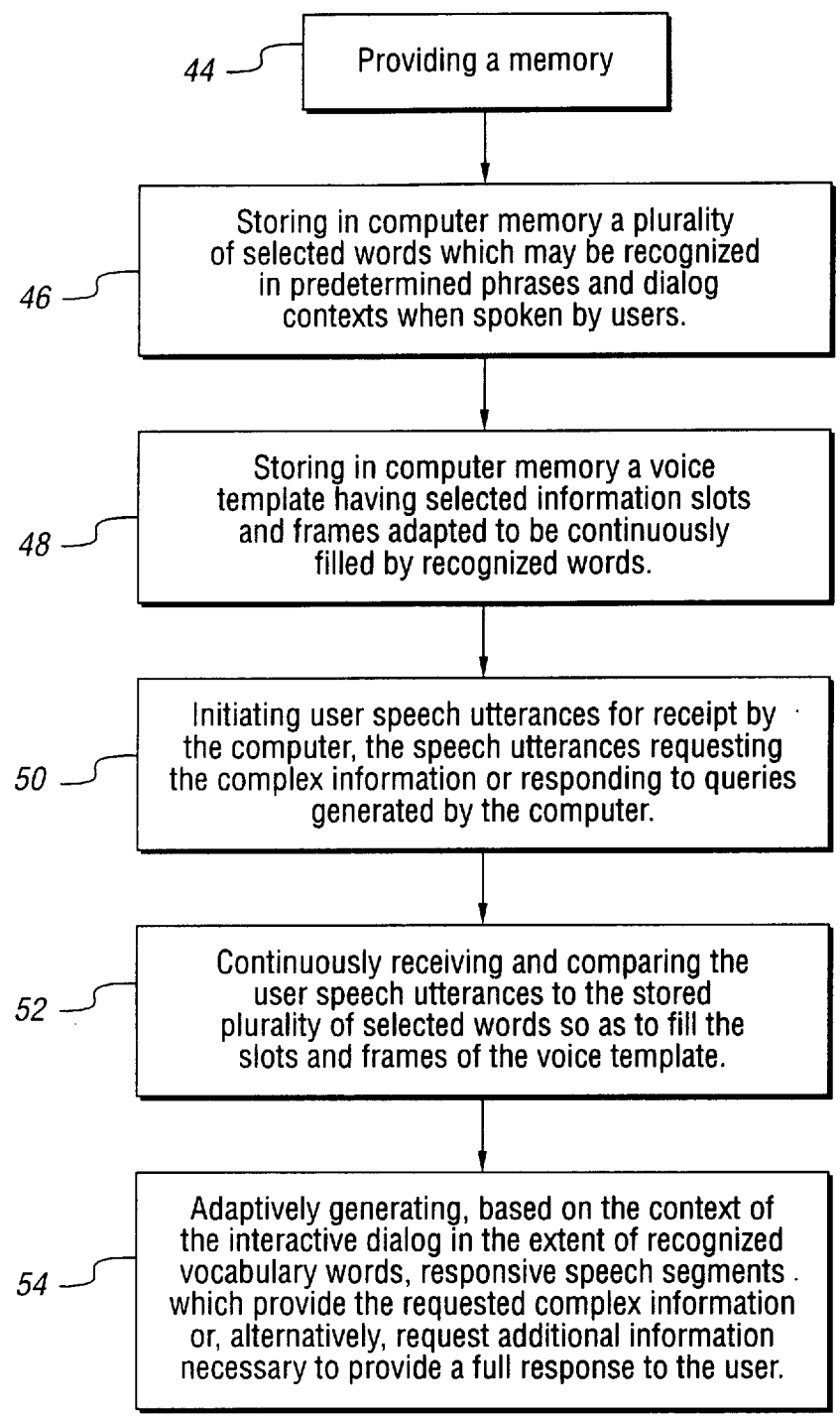
FIG. 4 is a block diagram of the method steps of the present invention.

With reference now to FIGS. 2 and 4 of the drawings, the method of operation of the above-referenced system and, in particular, speech recognition module 12 will be described in further detail.

As discussed above, speech recognition module 12 includes as a subcomponent, voice template 14. Template 14 contains several predetermined frames such as "current location", "orientation", "destination", as well as "other" categories. Each of these frames may be further visualized as having a corresponding slot fillers which are stored in computer memory and contain one or more vocabulary words or phrases, which, when recognized in predetermined combinations and sequences, correspond to the referenced frame. For example, the phrase "I am at . . . " may be visualized as one slot-filler identifying the frame of determining the user's current location 32. Similarly, the phrase "I am facing . . . " identifies the frame wherein the user's orientation is being determined. Finally, the phrase "I want to go . . . " identifies the frame wherein the user's destination is sought to be determined. By continuously receiving, processing and comparing the user speech utterances to each corresponding plurality of templates 40, and in particular, the corresponding vocabulary words or phrases contained in each of the templates, a determination may be made of the current frame of the interactive voice dialogue.

Once the dialogue frame has been determined, key vocabulary words or phrases (slot-fillers) must be looked for in the user's utterance in order to complete the frame and trigger activities such as rate-planning, etc. provide the impression of a linguistically competent computer.

Significantly, as the dialogue changes states or contexts (e.g. from determining the caller's current location to determining her orientation or destination), different corresponding templates are utilized. Each such set supplies to the speech recognition component 12 a different set of key words to search for in the caller's utterances. Thus, for example, besides providing a generalized "current location" template utilized upon initialization of the system, a multitude of location templates may be provided, each of which has a predetermined set of corresponding street names and landmark names which are recognized depending upon the user's approximate location.

The stored set of vocabulary words or phrases corresponding to each of the selected frames of voice template 14 is provided as output from speech recognition module 12 to AI component 16 in the form of a string of words including destination and any other matching words in the vocabulary.

In keeping with the invention, the speech recognition module 12 performs the steps or functions shown in FIG. 2. These include analog to digital conversion 24, feature extraction/signal processing 26, pattern matching 28, and decision making 30. Depending on the particular task, the recognition may also include some preprocessing segmentation and/or some post-processing steps such as word hypothesis and sentence hypothesis using phonetic dictionary and language constraints. In the feature extraction step, the acoustics features required to uniquely identify a particular sound are extracted from the speech waveforms. The unit of sound used in recognition may vary from smallest unit phoneme to words/phrases. The complexity and limitation of a recognition system is defined by the size of these units.

In the pattern matching step, the input pattern is matched with some pre-stored reference patterns indicated at 32. A variety of modeling/pattern matching techniques are used in speech recognition which include simple template matching, stochastic modeling and matching (Hidden Markov Models) and Neural Networks. In the present system, a limited but flexible vocabulary speech recognition system is used. Preferably, the recognition system accepts continuously spoken utterances. The vocabulary may include the names of some hotels, business locations, landmarks/Govt. offices in the city of interest, some destination indicators such as "going to", "would like to go to", "need to get to", some present location indicators such as "starting location is", "I am at", confirmation vocabulary such as "yes", "no", "that's right" and other command words such as "help", "repeat", "done", and "bye".

Figure 3:
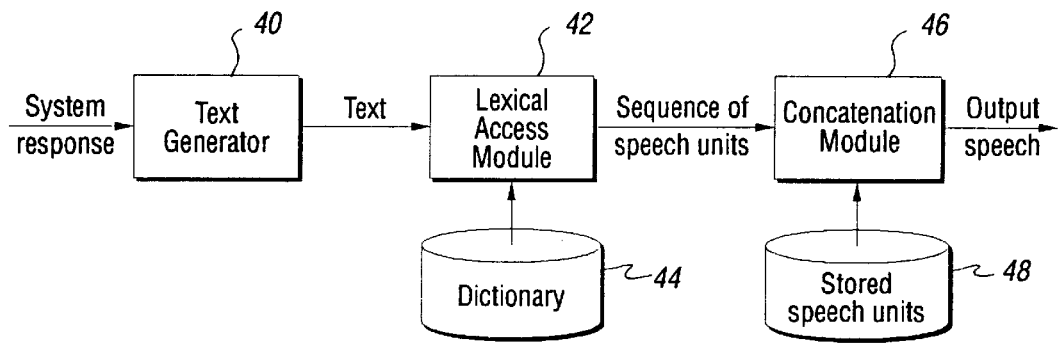
FIG. 3 is a block diagram of the text-to-speech synthesizer of the present invention.

The speech synthesis module 18 performs the function of converting input text, consisting of words, phrases, or sentences, into speech waveform signals which can then be converted to an analog signal and played through a speaker. A block diagram of a text-to-speech synthesizer is shown in FIG. 3. The desired system response as determined by the dialogue manager AI component 16 provides an input to a text generator 34 which produces a prompt message in text form. This message is transformed to smaller units, such as phrases, words, phonemes, diphones, syllables or demisyllables, by a lexical access module 36 which receives information from a dictionary 38. These units are then converted to speech waveform by synthesis algorithms and concatenated in a module 40 which is provided with inputs from stored speech units 42, to produce meaningful utterances. The complexity of the system is directly related to the size of the unit and vocabulary size. As the size of the unit increases (from phoneme to medium size units such as diphones, demisyllables or large size units words/phrases), the memory requirement increase exponentially. Each of these units can either be prerecorded or be synthesize using articulatory synthesis, format synthesis or LPC (Linear Predictive Coding) synthesis.

In response to a call, the telephone interface 20a, 20b connects the user to the system. The AI component 16 detects the state of the interface 20a and initiates a dialogue by communicating a general query or digitized recorded prompt in the form of a text message to synthesizer 18. The synthesizer converts the text to a speech signal and prompts the caller with the message which may be for example, "Where would you like to go?" If the caller responds with an utterance, such as "I am going to the airport" a digitally sampled version of the utterance is input to the module 12 for recognition.

As referenced above, a set of key words are obtained from the AI component 16 and, in the preferred embodiment, a knowledge base and passed to the module 12. The set of key words include those that are appropriate to the frame of the prompt or query from the AI component 16. The module 12 matches and recognizes the key words, i.e, uses them to fill slots. The module 18 parses the text and sends slot <DEST IND> with content <GOING TO> and slot <DESTINATION> with content <AIRPORT> to the AI component 16. The AI component 16 fills the <DESTINATION> slot with <AIRPORT> and where recognition confidence is low, sends the text prompt "Please confirm that your destination is the airport" to the synthesizer 18 which communicates the message to the user.

Once destination, orientation and current location are obtained, the AI component 16 calls a route computation subroutine. The route information is returned to the AI component from whence it is provided to the module 12 for communication to the user.

The AI component 16 initiates, and then must maintain, a dialogue with the caller. In operation, it recognizes words and utterances that belong to a set of key words including, for example, "WHY", "DO YO", "CAN YOU", "DON'T KNOW", "WHERE AM I", "HELP", etc. The key words further include a set of commands such as "QUIT", "FAX ME", "TELL ME", etc. These words identify query frames (e.g., "HOW FAR" identifies the "distance query" frame) Each frame, when identified, creates and plays a response (e.g., by computing the distance assembling a text response, and playing it).

Referring now to FIG. 4 of the drawings, a computerized method of providing user access to complex information through interactive or voice dialogue will be described in further detail. As shown, the method includes providing 44 a memory. The method further includes storing 46 in the computer memory a plurality of selected words which may be recognized in predetermined phrases and dialogue contexts when spoken by users. Still further, a voice template is stored 48 in computer memory which has selected information slots and corresponding frames. Each of the slots and frames are adapted to be continuously filled by recognized words. By initiating 50 user speech utterances directed for receipt by the computer, requests may be made for complex information or responses may be provided to queries generated by the computer. The user speech utterances are continuously received and compared 52 to the stored plurality of selected words so as to fill the slots and frames of the voice template. Thereafter, responsive speech segments or additional information requests are adaptively generated 54 based on the context of the interactive dialogue and the extent of recognized vocabulary words.

Providing a Memory

Storing in computer memory a plurality of selected words which may be recognized in predetermined phrases and dialog contexts when spoken by users.

Storing in computer memory a voice template having selected information slots and frames adapted to be continuously filled by recognized words.

Initiating user speech utterances for receipt by the computer, the speech utterances requesting the complex information or responding to queries generated by the computer.

Continuously receiving and comparing the user speech utterances to the stored plurality of selected words so as to fill the slots and frames of the voice template.

Adaptively generating, based on the context of the interactive dialog in the extent of recognized vocabulary words, responsive speech segments which provide the requested complex information or, alternatively, request additional information necessary to provide a full response to the user.

While the best mode for carrying out the invention has been described in detail, those familiar with the art to which this invention relates will recognize various alternative designs and embodiments for practicing the invention as defined by the following claims.

What is claimed is:

1. A computerized method for providing user access to an adaptive knowledge base of complex information through an interactive voice dialogue, comprising:

providing a memory;

storing in memory a plurality of selected words as recognized in predetermined phrases and contexts when spoken by a user;

storing in memory a voice template having selected information slots in corresponding frames, each of the slots and frames adapted to be continuously filled by recognized words, wherein the selected information slots comprise "current location", "destination" and "orientation", and wherein the frames corresponding to the "current location", "destination", and "orientation" slots each comprise "cross street" and "landmarks";

initiating user speech utterances for receipt by the computer, the speech utterances requesting complex information;

continuously receiving and comparing the user speech utterances to the stored plurality of selected words so as to fill the slots and frames of the voice template; and adaptably generating, based on the context of the interactive dialogue and the extent of filled slots and frames of the voice template, responsive speech segments which provide the requested complex information or, alternatively, request additional information necessary to provide a full response to the user.

2. A system for providing user access to an adaptive knowledge base of complex information through an interactive voice dialogue, comprising:

a computer having a memory and adapted to store a plurality of selected words as recognized in predetermined phrases and contexts when spoken by a user;

a voice template having selected information slots and corresponding frames, each of the slots and frames adapted to be continuously filled by recognized words, the voice template also adapted to be stored in the computer memory, wherein the selected information slots comprise "current location", "destination" and "orientation", and wherein the frames corresponding to the "current location", "destination", and "orientation" slots each comprise "cross street" and "landmarks";

a processor in electrical communication with the computer memory, the processor adapted to continuously receive and compare user speech utterances requesting complex information to the stored plurality of selected words so as to fill the slots and frames of the voice template; and means for adaptably generating, based on the context of the interactive dialogue and the extent of filled slots and frames of the voice template, responsive speech segments which provide the requested complex information or, alternatively, request additional information necessary to provide a full response to the user.

* * * * *